US008073677B2

(12) United States Patent
Furihata et al.

(10) Patent No.: US 8,073,677 B2
(45) Date of Patent: Dec. 6, 2011

(54) SPEECH TRANSLATION APPARATUS, METHOD AND COMPUTER READABLE MEDIUM FOR RECEIVING A SPOKEN LANGUAGE AND TRANSLATING TO AN EQUIVALENT TARGET LANGUAGE

(75) Inventors: Kentaro Furihata, Kawasaki (JP); Tetsuro Chino, Kawasaki (JP); Satoshi Kamatani, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 936 days.

(21) Appl. No.: 12/048,255

(22) Filed: Mar. 14, 2008

(65) Prior Publication Data

US 2008/0243474 A1 Oct. 2, 2008

(30) Foreign Application Priority Data

Mar. 28, 2007 (JP) ................................. 2007-085701

(51) Int. Cl.
*G06F 17/28* (2006.01)
(52) U.S. Cl. ............. 704/2; 704/3; 704/4; 704/5; 704/6; 704/7; 704/231; 704/258
(58) Field of Classification Search ................... 704/2–7, 704/231, 258
See application file for complete search history.

(56) References Cited

U.S. PATENT DOCUMENTS

| 5,546,500 | A  | * | 8/1996  | Lyberg ........................... 704/277 |
| 6,952,665 | B1 | * | 10/2005 | Shimomura et al. .............. 704/2 |
| 6,999,932 | B1 | * | 2/2006  | Zhou ............................. 704/277 |
| 2003/0149558 | A1 | * | 8/2003  | Holsapfel et al. ................. 704/4 |
| 2004/0172257 | A1 | * | 9/2004  | Liqin et al. ..................... 704/277 |
| 2004/0193398 | A1 | * | 9/2004  | Chu et al. ........................... 704/3 |
| 2004/0243392 | A1 | * | 12/2004 | Chino et al. ...................... 704/7 |
| 2008/0059147 | A1 | * | 3/2008  | Afify et al. ........................ 704/5 |
| 2009/0055158 | A1 | * | 2/2009  | Xu et al. ........................... 704/2 |

FOREIGN PATENT DOCUMENTS

JP 2001-117922 4/2001

* cited by examiner

*Primary Examiner* — Douglas Godbold
(74) *Attorney, Agent, or Firm* — Finnegan, Henderson, Farabow, Garrett & Dunner, L.L.P.

(57) ABSTRACT

Speech translation apparatus includes first generation unit generating first text representing speech recognition result, and first prosody information, second generation unit generating first para-language information, first association unit associating each first portion of first text with corresponding first portion of first para-language information, translation unit translating first text into second texts, second association unit associating each second portion of first para-language information with corresponding second portion of each second text, third generation unit generating second prosody-information items, fourth generation unit generating second para-language-information items, computation unit computing degree-of-similarity between each first para-language information and corresponding one of second para-language-information items to obtain degrees of similarity, selection unit selecting, from second prosody-information items, maximum-degree-of-similarity prosody information corresponding to maximum degree, fifth generation unit generating prosody pattern of one of second texts which corresponds to maximum-degree-of-similarity prosody information, and output unit outputting one of second texts which corresponds to maximum-degree-of-similarity prosody information.

21 Claims, 6 Drawing Sheets

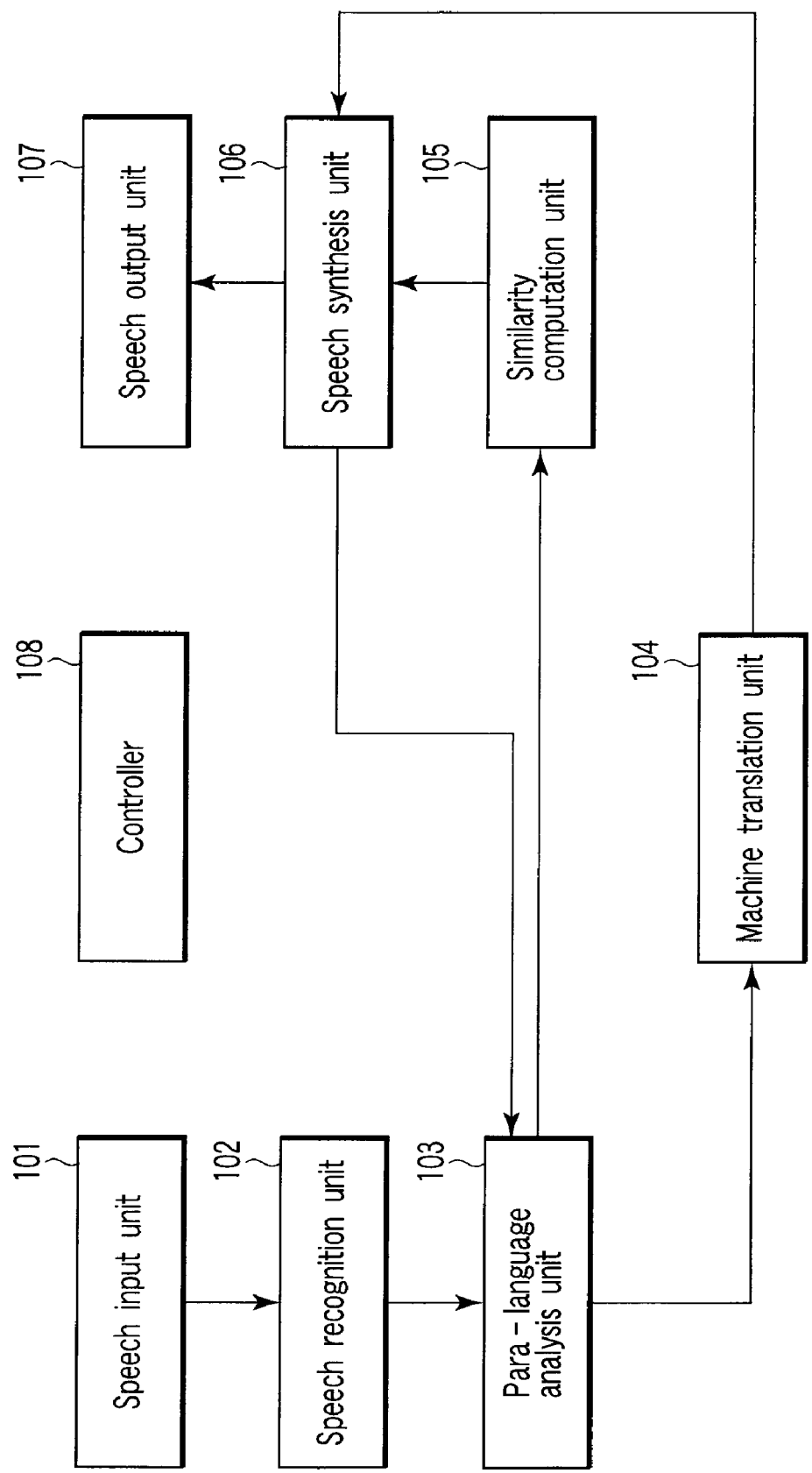
F I G. 1

I=[taro stopped smoking surely]

FIG. 2

|  | Speech recognition information (RSP indicates volume) | | | |
|---|---|---|---|---|
| RST | Taro | Stopped | Smoking | Surely |
| RSP | 2 | 3 | 2 | 1 |

FIG. 3

|  | Text with emphasis tags |
|---|---|
| RSTP | Taro <emph>stopped</emph> Smoking surely |

FIG. 4

| | With emphasis tags | | With no emphasis tags |
|---|---|---|---|
| GTTP1 | 太郎は確かにタバコを\<emph\>止めた\</emph\><br>(Taro) (Surely)(Smoking) (Stopped) | GTTN1 | 太郎は確かにタバコを止めた<br>(Taro) (Surely)(Smoking) (Stopped) |
| GTTP2 | 太郎はタバコをぴったり\<emph\>止めた\</emph\><br>(Taro) (Smoking) (Surely) (Stopped) | GTTN2 | 太郎はタバコをぴったり止めた<br>(Taro) (Smoking) (Surely) (Stopped) |
| GTTP3 | 太郎はタバコを\<emph\>止めた\</emph\>はずだ<br>(Taro) (Smoking) (Stopped ) (Surely) | GTTN3 | 太郎はタバコを止めたはずだ<br>(Taro) (Smoking)(Stopped) (Surely) |

FIG. 5

|  | Generated prosody information | | | | |
|---|---|---|---|---|---|
| GTTN1 | GTT1 | 太郎は (Taro) | 確かに (Surely) | タバコを (Smoking) | 止めた (Stopped) |
|  | GTP1 | 2 | 3 | 2 | 3 |
| GTTN2 | GTT2 | 太郎は (Taro) | タバコを (Smoking) | ぴったり (Surely) | 止めた (Stopped) |
|  | GTP2 | 2 | 2 | 3 | 2 |
| GTTN3 | GTT3 | 太郎は (Taro) | タバコを (Smoking) | 止めた (Stopped) | はずだ (Surely) |
|  | GTP3 | 2 | 2 | 3 | 1 |

FIG. 6

|  | With emphasis tags |
|---|---|
| RTTP1 | 太郎は\<emph>確かに\</emph>タバコを\<emph>止めた\</emph><br>(Taro)　　　(Surely)　　　(Smoking)　　　(Stopped) |
| RTTP2 | 太郎はタバコを\<emph>ぴったり\</emph>止めた<br>(Taro)(Smoking)　　　(Surely)　　　(Stopped) |
| RTTP3 | 太郎はタバコを\<emph>止めた\</emph>はずだ<br>(Taro)(Smoking)　　　(Stopped )　　　(Surely) |

FIG. 7

O=[太郎はタバコを止めたはずだ]
 　(Taro)　(Smoking)　(Stopped )　(Surely)

FIG. 9

| Alignment | | Score |
|---|---|---|
| GTTP1, RTTP1 | 太郎はタバコを<emph=RTTP1>確かに</emph>タバコを<emph=both>止めた</emph><br>(Taro) (Surely) (Smoking) (Stopped) | 1−1*1/2=0.5 |
| GTTP2, RTTP2 | 太郎はタバコを<emph=RTTP2>ぴったり</emph><emph=GTTP2>止めた</emph><br>(Taro)(Smoking) (Surely) (Stopped) | 0 |
| GTTP3, RTTP3 | 太郎はタバコを<emph=both>止めた</emph>はずだ<br>(Taro) (Smoking) (Stopped) (Surely) | 1 |

F I G. 8

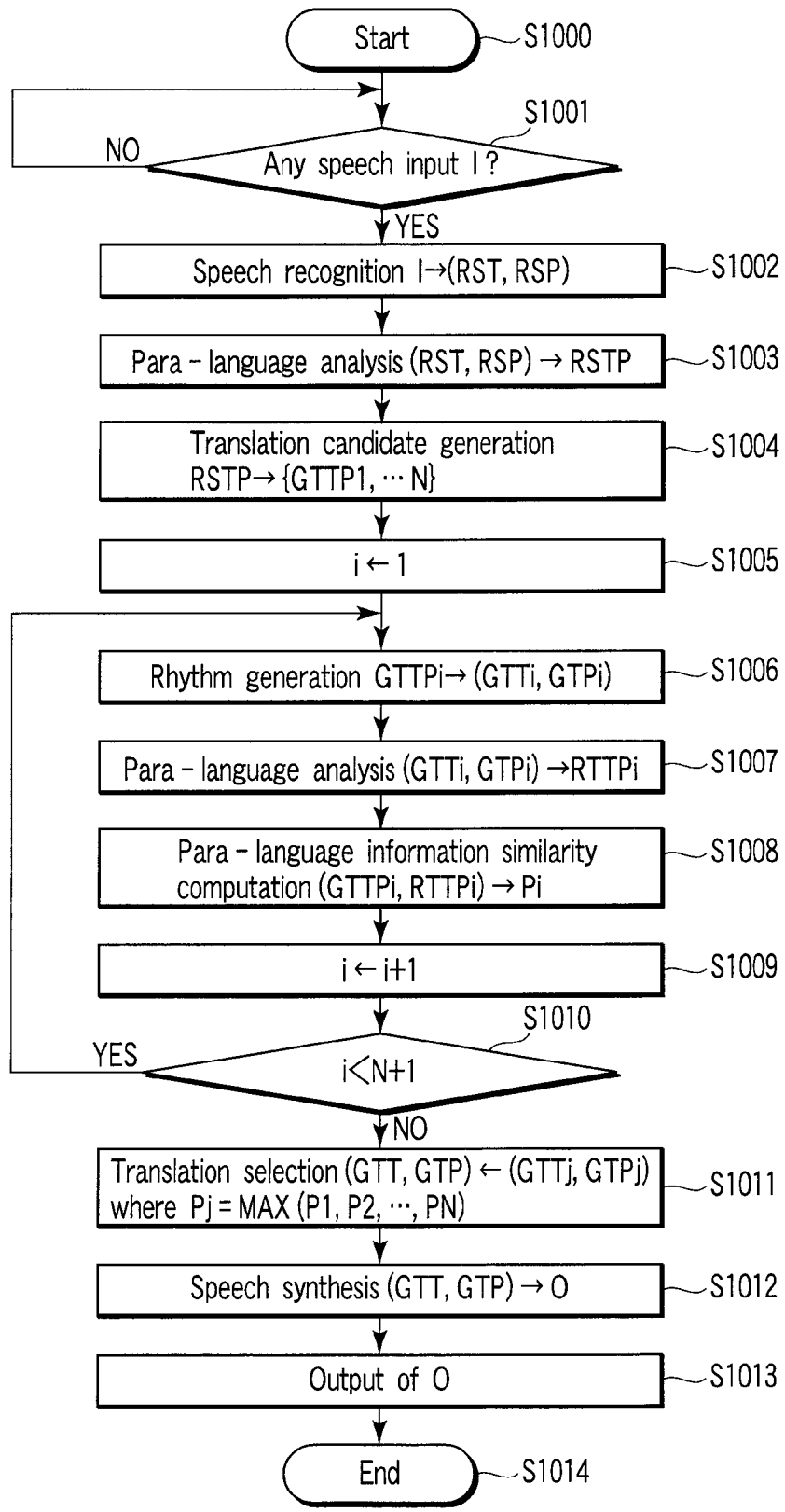
F I G. 10

SPEECH TRANSLATION APPARATUS, METHOD AND COMPUTER READABLE MEDIUM FOR RECEIVING A SPOKEN LANGUAGE AND TRANSLATING TO AN EQUIVALENT TARGET LANGUAGE

CROSS-REFERENCE TO RELATED APPLICATIONS

This application is based upon and claims the benefit of priority from prior Japanese Patent Application No. 2007-085701, filed Mar. 28, 2007, the entire contents of which are incorporated herein by reference.

BACKGROUND OF THE INVENTION

1. Field of the Invention

The present invention relates to a speech translation apparatus for receiving a spoken original language and outputting a spoken target language equivalent in meaning to the original language, and a speech translation method and program for use in the apparatus.

2. Description of the Related Art

In recent years, research into elemental technologies such as speech recognition, machine translation and speech synthesis has progressed, and speech translation systems are now being put into practical use, which combine the technologies to output a spoken target language when receiving a certain spoken original language.

In most speech translation systems, an original-language text acquired by recognizing input speech in an original language by speech recognition is converted into a target-language text equivalent thereto in meaning, and speech in the target language is output utilizing speech synthesis.

In the above speech recognition, a text as a recognition result is generated mainly using the feature of phonemes contained in input speech. However, speech also contains prosody information, such as accents and intonations, which not only imparts constraints on language information concerning accents and/or structure, but also expresses information (para-language or phatic-language information) other than language, such as the feeling or intent of speakers. The para-language information enables enriched communications between speakers, although it does not appear in the text as the recognition result.

To realize more natural communication via speech translation systems, a scheme has been proposed in which para-language information expressed by prosody is reflected in output speech as a translation result. For instance, a scheme has been proposed in which a machine translation unit and speech synthesis unit require, when necessary, a speech recognition unit to supply prosody information (see, for example, JP-2001-117922 (KOKAI)).

Suppose here that English speech, "Taro stopped smoking <emph>surely</emph>" (the portion between the tags <emph>and </emph> is emphasized), is input to, for example, an English/Japanese speech translation system, with "surely" emphasized, pronounced with a greater volume or more slowly. In this case, the above-mentioned existing schemes enable the English/Japanese speech translation system to output a Japanese translation result, i.e., "太郎は確かにタバコ を<emph>止めた</emph>," with a Japanese word group, "止めた,"corresponding to "surely," emphasized, pronounced, for example, with a greater volume.

However, when a conventional speech synthesis scheme is used, natural and appropriate emphasis of a to-be-emphasized portion cannot always be realized. For instance, in a synthesis target Japanese sentence "太郎はタバコを ぴったり止めた," the Japanese word "ぴったり(pronounced in 'pittari')" has an accent core "pi," and hence it is natural to speak the word with a higher pitch. Thus, since in natural speech, the word "ぴったis spoken with a higher pitch, even if the next Japanese word "止めた,"is spoken with a higher pitch to emphasize it, this word will not be so conspicuous. In contrast, if the volume or pitch of the word "ぴったりis greatly changed to emphasize it, natural speech cannot be realized.

Namely, the prosody of sentences are produced based on both accents and intonations, and the to-be-produced prosody pattern of an emphasized portion is modified by the prosody pattern of the words around an emphasized word.

Further, in JP-2001-117922 (KOKAI) mentioned above, to make prosody information on an original language correspond to prosody information on a target language, examples of translation rules recited along with prosody information are disclosed. As described above, to always produce a translation that enables the speech synthesis unit to produce appropriate and natural prosody, it is necessary to consider the influence of information indicating, for example, the ambient words or syntax structure. However, it is difficult to write translation rules covering all these things. Further, writers of translation rules must be familiar to the prosody production patterns employed in the speech analysis unit.

In summary, the above-described conventional schemes have the following problems:

1. There are texts which it is difficult even for known prosody producing schemes considering to-be-emphasized portions to translate so that only to-be-emphasized portions are emphasized appropriately and naturally.

2. In machine translation, it is difficult to establish translation rules for outputting translation results that enable natural prosody to be produced by a later prosody producing process.

3. In machine translation, if a target-language text as a translation result is converted into emphasized syntax, using para-language information concerning the original language, which is an emphasized portion can be informed. In this method, however, the equivalence in meaning between the original language and target language may well be degraded. Accordingly, it is natural that emphasis information contained in the prosody of input speech is expressed as the prosody of a target-language speech.

BRIEF SUMMARY OF THE INVENTION

In accordance with an aspect of the invention, there is provided a speech translation apparatus using speech recognition comprising: a first generation unit configured to generate a first text representing a speech recognition result obtained by subjecting an input speech in a first language to speech recognition, and first prosody information corresponding to the input speech, the first text containing a plurality of first portions each including at least one word; a second generation unit configured to generate, from the first prosody information, first para-language information other than a text contained in the input speech, the first para-language information containing the first portions and a plurality of second portions; a first association unit configured to associate each first portion of the first text with a corresponding first portion of the first portions of the first para-language information; a translation unit configured to translate the first text into a plurality of second texts in a second language, the second texts each containing the second portions; a second association unit configured to associate each second portion of the first para-language information with a corresponding second portion of the second portions of each of the second texts that is one portion obtained by translating each first portion of the first text; a third generation unit configured to generate a plurality of second prosody information items based on speech feature amounts acquired from the second texts; a fourth generation unit configured to generate a plurality of second para-language information items by changing order of the first and second portions of the first para-language information to correspond to the second texts, based on the second prosody information items, the second para-language information items corresponding to the second texts; a computation unit configured to compute, for each second text, a degree of similarity between each of the first para-language information items and a corresponding one of the second para-language information items to obtain degrees of similarity for the second texts; a selection unit configured to select, from the second prosody information items, maximum-degree-of-similarity prosody information corresponding to a maximum degree of similarity from the degrees of similarity; a fifth generation unit configured to generate a prosody pattern of one of the second texts which corresponds to the maximum-degree-of-similarity prosody information, based on the maximum-degree-of-similarity prosody information; and an output unit configured to output one of the second texts which corresponds to the maximum-degree-of-similarity prosody information, in a form of speech according to the prosody pattern.

BRIEF DESCRIPTION OF THE SEVERAL VIEWS OF THE DRAWING

FIG. 1 is a block diagram illustrating a speech translation apparatus according to an embodiment;

FIG. 2 is a view illustrating an example of a speech input to the speech input unit of FIG. 1;

FIG. 3 is a view illustrating an example of a speech recognition result, i.e., speech recognition information, of the speech recognition unit of FIG. 1;

FIG. 4 is a view illustrating an example of a text with emphasis tags acquired by the para-language analysis unit of FIG. 1;

FIG. 5 is a view illustrating an example of a translation-candidate output by the machine translation unit of FIG. 1;

FIG. 6 is a view illustrating an example of generated prosody information output from the speech synthesis unit of FIG. 1;

FIG. 7 is a view illustrating an example of a text with an emphasis tag imparted by the para-language analysis unit of FIG. 1;

FIG. 8 is a view illustrating an example of a degree of similarity computed by the similarity computation unit of FIG. 1;

FIG. 9 is a view illustrating an example of a speech output from the speech output unit of FIG. 1; and FIG. 10 is a flowchart useful in explaining an operation example of the speech translation apparatus of FIG. 1.

DETAILED DESCRIPTION OF THE INVENTION

A speech translation apparatus, method and program according to an embodiment of the invention will be described in detail with reference to the accompanying drawings.

The speech translation apparatus, method and program of the invention can appropriately reflect, in a speech as a prosody translation result, para-language information contained in the prosody of input speech, and produce natural prosody.

FIG. 1 is a block diagram illustrating the speech translation apparatus according to the embodiment. The speech translation apparatus of the embodiment comprises a speech input unit 101, speech recognition unit 102, para-language analysis unit 103, machine translation unit 104, similarity computation unit 105, speech synthesis unit 106, speech output unit 107 and controller 108.

(Speech Input Unit 101)

Under the control of the controller 108, the speech input unit 101 receives the speech of a speaker speaking a first or second language, using, for example, a microphone, converts the speech into an electrical signal, and converts the signal into a digital signal of a Pulse Code Modulation (PCM) format, using a known analog-to-digital conversion method.

Referring then to FIG. 2, a description will be given of an example of a speech input to the speech input unit 101.

FIG. 2 is a view illustrating an example of a speech input to the speech input unit 101. FIG. 2 shows an input example 1 of English speech. In this example, suppose that an accent was put on, in particular, "stopped" included in a sentence "taro stopped smoking surely" to emphasize the word. The emphasized portion is indicated by a font with a greater size.

(Speech Recognition Unit 102)

The speech recognition unit 102 receives a digital signal from the speech input unit 101, and extracts the components of the signal in units of signal frames with a length of several tens millimeters, using a spectrum analysis scheme such as short-time Fourier analysis or LCP analysis, thereby acquiring a power spectral sequence. Further, it separates, from the power spectral sequence, the spectra of a speech source signal using cepstrum analysis, and extracts cepstrum coefficients as the parameters of an articulation filter that indicate the features of the phonemes contained in the speech signal.

The speech recognition unit 102 acquires, from cepstrum coefficients as phoneme feature amounts, a maximum likelihood word sequence using acoustic models, such as a phoneme model acquired from a learning model (e.g., hidden Markov model [HMM]), and a word model acquired by connecting phoneme models, or a language model such as n-Gram. The speech recognition unit 102 simultaneously extracts, from the maximum likelihood word sequence, variations with time in the basic frequency (F0) of each frame or the power of each frame, which is used as a prosody feature amount in a later process.

The format of outputting the prosody feature amount is determined based on para-language analyses performed in a later stage. The prosody feature amount may be directly output. Alternatively, a value normalized in each necessary zone may be output, or pitch pattern information may be output.

The processes performed after the above can be realized by known schemes, and hence are not described.

Referring then to FIG. 3, a description will be given of an example of speech recognition information indicating recognized input speech I and output from the speech recognition unit 102. FIG. 3 shows an example of a speech recognition result of the speech recognition 102, i.e., speech recognition information concerning the input speech I shown in FIG. 2. The speech recognition information is formed of a combination of an original-language text RST and corresponding prosody information RSP. In the embodiment, the power of the accent(s) of each word is normalized as a value included in three-stage values. In RSP, a value of 3 indicates the maximum volume, and a value of 1 indicates the minimum volume. In the shown example, the volume of "stopped," on which an accent is placed, is the maximum value of 3.

(Para-Language Analysis Unit 103)

Based on the speech recognition information (original-language text RST and prosody information RSP) output from the speech recognition unit 102, the para-language analysis unit 103 classifies the text RST into groups corresponding to the influence ranges of para-language information to be determined, thereby outputting a text RSTP in which para-language tags are imparted to a target zone (or zones) in the text RST.

For instance, regarding emphasis determination, each word is classified into 2-value (emphasis/non-emphasis) classes (when necessary, three or more values), depending upon whether each word contains a strong/weak accent(s) or high/low accent(s). Each emphasized portion is discriminated from the other portions by, for example, inserting an emphasized word between emphasis tags (<emph>, </emph>). Further, regarding determination as to the intent of the entire speech (question, suspect, denial, etc.), the entire speech is inserted between intent tags (<int=suspect>, </int>).

A description will now be given of determination as to emphasis portions. Each emphasis portion of speech is regarded as a portion with an accent, which is spoken with a greater volume or higher pitch or more slowly than the other portions. The way of putting an accent differs between different languages. For instance, in English, an accent is often put by increasing the loudness, while in Japanese, it is often put by heighten the pitch. Accordingly, when English speech recognition information as shown in FIG. 3 is acquired, it would be sufficient if the determination is performed based on the power value (RSP).

Referring then to FIG. 4, a description will be given of an example of a text with emphasis tags imparted by the para-language analysis unit 103. Specifically, FIG. 4 shows a text RSTP in which the word emphasized is determined based on the speech recognition information shown in FIG. 3, and is inserted between emphasis tags. In this example, the word with a maximum power value (RSP) is determined to be an emphasized portion. Namely, "stopped" included in RST {Taro stopped smoking surely} that has a maximum value of 3 is regarded as an emphasized portion and inserted between emphasis tags. Note that para-language information is information other than the language (text), such as the feeling or intent of a speaker, and corresponds to information that indicates the portion emphasized by the tags.

Alternatively, the emphasized portion may be determined using the speech feature amount of each frame. Further, although in the example, para-language tags are imparted, other expression formats may be employed to specify the portion in an original-language text RST to which para-language information is imparted.

Further, the para-language analysis unit 103 receives generated prosody information (shown in, for example, FIG. 6) from the speech synthesis unit 106, classifies the text RST into groups corresponding to the influence ranges of para-language information to be determined, thereby outputting a text RSTP in which para-language tags are imparted to a target zone (or zones) in the text RST (see, for example, FIG. 7). FIG. 7 shows a case where emphasis tags are imparted to a text by the para-language analysis unit 103. The para-language analysis unit 103 imparts emphasis tags to the Japanese word groups corresponding to the highest value in FIG. 6.

(Machine Translation Unit 104)

The machine translation unit 104 receives an original-language text (original-language text S, i.e., a first or second language text S) from the para-language analysis unit 103, and converts it into a second or first-language text (hereinafter referred to as "the target-language text T") equivalent in meaning to the original-language text. For this conversion, a transfer method for converting an input text using a dictionary and structure conversion rules, or an example utilizing method for selecting an example having a higher similarity with respect to an input text can be utilized. These methods are known techniques, and are not described in detail.

During translation, the machine translation unit 104 also associates original-language tags with target-language tags. In most normal translations, a single translation candidate is output. In the present process, however, the machine translation unit 104 outputs a plurality of translation candidates, using a known converted-expression generation method.

Referring then to FIG. 5, a description will be given of examples of translation candidates output by the machine translation unit 104. FIG. 5 shows a case where three translation candidates (target-language candidates) are generated for the emphasis-tag imparted text RSTP of FIG. 4. In the target-language texts, emphasis tags are imparted to the portions corresponding to the tag-imparted portions of the text RSTP ({GTTP1, GTTP2, GTTP3}).

The three Japanese candidates GTTP1, GTTP2 and GTTP3 are different translations of "Surely" (i.e., "確Since emphasis tags are imparted to "Surely," the candidates are also provided with emphasis tags. The speech synthesis unit 106 receives texts {GTTN1, GTTN2, GTTN3} without the tags (see the right-hand portion of FIG. 5).

(Speech Synthesis Unit 106)

The speech synthesis unit 106 generates prosody from the target-language texts output from the machine translation unit 104. Specifically, the speech synthesis unit 106 receives, for example, the information of the right-hand portion of FIG. 5, and outputs, for example, the information of FIG. 6. FIG. 6 shows which Japanese word groups are emphasized. The prosody information generated by the speed synthesis unit 106 indicates, using a value, to what degree each Japanese word set, each set including at least one Japanese word group, is emphasized. The higher the value, to a higher degree the Japanese word set is emphasized. For instance, in GTTN1, the highest value of 3 is imparted to the Japanese word sets "確か" which means that these Japanese word sets are most emphasized.

Each Japanese word group is a unit of a sentence and includes at least one content word and a functional word belonging thereto. The content word is a Japanese noun, verb, adjective, adverb or interjection. The functional word is a post-positional part particle of Japanese or auxiliary verb.

The speech synthesis unit 106 can be realized using a known speech synthesis scheme, such as the HMM speech synthesis scheme. In the HMM speech synthesis scheme, speech feature amounts, such as spectra, F0 and phoneme continuation length, are beforehand learned by HMM model for each context (e.g., morpheme, phoneme, accent type) acquired by language analysis from a speech database. When a text is input, it is analyzed and coupled to a generated phoneme HMM along with the context, thereby forming an HMM corresponding to the text and acquiring optimal speech feature amounts. To acquire a speech output, its waveform is synthesized using a known synthesizing filter. The speech synthesis unit 106 generates such prosody information as shown in FIG. 6 and outputs it to the para-language analysis unit 103, and outputs a prosody pattern based on the generated prosody information to the speech output unit 107 described later.

(Similarity Computation Unit 105)

The similarity computation unit 105 computes the degree of similarity in the positions of emphasis tags. For instance, the similarity computation unit 105 computes the degree of similarity between GTTPv (v=1, 2, 3) as the left-hand portion of FIG. 5 and RTTPv shown in FIG. 7. Suppose here that the number of the emphasis tag pairs included in an original text (the output of the machine translation unit 104, the left-hand portion of FIG. 5) is M, and the number of the emphasis tag pairs included in a post-text (a tag-imparted text output from the para-language analysis unit 103 and shown in FIG. 7) is N, and the number of the positions at which the emphasis-tag pairs of the original text coincide in position with those of the post-text is L ($L \leq N$ and $L \leq M$). In this case, the degree of similarity can be computed from the following expressions:

When $L>0, L/M-\alpha \times (N-L)/N$

When $L=0, 0$ where $\alpha$ is a weight coefficient as a penalty for a position at which an emphasis-tag pair in the original text does not coincide in position with that of the post-text, and is 1.

After that, the similarity computation unit 105 selects generated prosody information (GTTm, GTPm) corresponding to the maximum value among all computed similarity degrees, and outputs it to the speech synthesis unit 106.

Referring to FIG. 8, a description will be given of examples of similarity scores. The "Alignment" section in FIG. 8 shows the emphasis tags of GTTPv and those of RTTPv. The "Score" section shows degrees of similarity computed using the above expressions. For instance, regarding GTTP1 and RTTP1, L=1, M=1, N=2, and accordingly the degree of similarity therebetween is $1/1-1\times(2-1)/2=0.5$.

(Speech Output Unit 107)

The speech output unit 107 receives a digital signal corresponding to the second (first) language and output from the speech analysis unit 106, and outputs speech in the second (first) language using known digital-to-analog conversion (D/A conversion). FIG. 9 shows an example of a speech output of the speech output unit 107. In the example of FIG. 9, speech is output with the Japanese word "止めた" (corresponding to "Stopped") emphasized.

The controller 108 controls the above-described elements incorporated in the speech translation apparatus of the embodiment. Referring to FIG. 10, the control of the controller 108 will be described.

At step S1000, the operation of the speech translation apparatus is started.

If it is determined at step S1001 that the speech input unit 101 has received a speech input I, the program proceeds to step S1002, whereas if it has not yet received any speech input I, the apparatus waits for receiving the speech input I.

At step S1002, the speech recognition unit 102 processes the input speech I to obtain speech recognition information (RST, RSP). RST is an original-language text as a recognition result, and RSP is prosody information thereof.

At step S1003, the para-language analysis unit 103 processes the speech recognition information (RST, RSP), thereby outputting an original-language text RSTP including the original-language text RST and para-language tags.

At step S1004, the machine translation unit 104 translates the original-language text RSTP, and generates N ($N \geq 1$) translation candidates GTT1-GTTN, and N candidates GTTP1-GTTPN obtained by imparting para-language tags to the candidates GTT1-GTTN.

At step S1005, 1 is set in a counter i.

At step S1006, the speech synthesis unit 106 processes the translation candidate GTTi based on GTTPi, thereby generating prosody information GTPi.

At step S1007, the para-language analysis unit 103 processes the translation candidate GTTi and generated prosody information GTPi corresponding thereto, and outputs a target-language text RTTPi obtained by imparting para-language tags to the target-language (translation) candidate GTTi.

At step S1008, the similarity computation unit 105 compares the target-language (translation) candidate GTTi with the target-language text RTTPi with the para-language tags, thereby acquiring a similarity degree Mi.

At step S1009, the value of the counter i is incremented by 1.

If it is determined at step S1010 that the value of the counter i is lower than N+1, the program returns to step S1006.

At step S1011, the similarity computation unit 105 searches translation similarity degrees M1 to MN for a maximum value Mm, and selects the generated prosody information (GTTm, GTPm) as a translation.

At step S1012, the speech synthesis unit 106 generates a digital signal corresponding to the generated prosody information (GTTm, GTPm), and sets the signal in an output register O.

At step S1013, the speech output unit 107 outputs the content of the output register O in the form of speech.

At step S1014, the program returns to step S1001.

The operation of the speech translation apparatus of the embodiment will now be described using a specific translation example.

Suppose, for example, that when an English speaker and Japanese speaker have a conversation using the speech translation apparatus of the embodiment, the English speaker has input speech I=[taro stopped smoking surely] as shown in FIG. 2 (step S1001). Assume here that speech has been made with an accent placed on "stopped."

At this time, the speech recognition unit 102 recognizes the speech I, and outputs, as speech recognition information (RST, RSP) shown in FIG. 3, the recognized text, and power information corresponding to each word (step S1002). The para-language analysis unit 103 generates, from the speech recognition information (RST, RSP), an emphasis-tag imparted text RSTP with tags imparted to an emphasized portion as shown in FIG. 4 (step S1003). In this case, since the power of "stopped" is maximum, this word is regarded as the emphasized portion.

The machine translation unit 104 generates, from the emphasis-tag imparted text RSTP, three translation candidates {GTTP1, GTTP2, GTTP3} and tag-removed texts {GTTN1, GTTN2, GTTN3} as shown in FIG. 5 (step S1004). Subsequently, 1 is set in the counter i (step S1005). The speech synthesis unit 106 generates prosody information (GTT1, GTP1) for the translation candidate GTTN1 as shown in FIG. 6 (step S1006). The para-language analysis unit 103 processes the generated prosody information (GTT1, GTP1), and produces a tag-imparted target-language text RTTP1 with emphasis tags imparted as shown in FIG. 5 (step S1007). The similarity computation unit 105 compares RTTP1 acquired at step S1007 with GTTP1 acquired at step S1004 to compute a similarity score P1 (step S1008). In this case, P1 is computed at 0.5 as shown in FIG. 8.

The value of the counter i is incremented by 1, and hence 2 is set as a new value therein (step S1009). Since the number N of the translation candidates is 3, and i=2, the program returns to step S1006 (step S1010). The same process as executed on GTTN1 is executed on GTTN2 (steps S1006 to S1010). At this time, since the value of the counter i is 3, the program again returns to step S1006. The same process as executed on GTTN1 is executed on GTTN3 (steps S1006 to S1010). At this time, since the value of the counter i is 4, the program proceeds to step S1011.

As described above, prosody information is generated for each translation candidate by iterating steps S1006 to S1010, emphasized portions are extracted from the generated prosody information, and matching is performed between the extracted emphasized portions and the portions of the translated text made to correspond to the emphasized portions in the original language during translation.

The similarity computation unit 105 selects, as a translated text, the translation candidate GTTP3 having a maximum value P3 among similarity scores P1, P2 and P3 (step S1011). The speech synthesis unit 106 generates a prosody pattern from the generated prosody information (GTT3, GTP3) already acquired at step S1008 (step S1012). The speech output unit 107 generates a digital signal corresponding to the prosody pattern, and outputs speech O (step S1013).

As described above, in the speech translation apparatus of the embodiment, first para-language information generated from input speech in a first language is made to correspond to a translated text in a second language acquired by translation. From generated prosody information corresponding to the translated text, a plurality of translation candidates are generated, and second para-language information items are generated from the translation candidates. Further, the degree of similarity between a first para-language information item corresponding to each of the translation candidates and the second para-language information item corresponding to the first para-language information item is computed. In accordance with prosody information corresponding to a maximum degree of similarity, a prosody pattern corresponding to the translated text is generated, thereby outputting the translated text in the form of speech in accordance with the generated prosody pattern. As a result, speech as a prosody translation result can appropriately reflect the para-language information contained in the prosody of input speech, and natural prosody can be produced. Thus, significant practical effects can be obtained.

The present invention is not limited to the above-described embodiment in effect and carrying-out method.

Although in the embodiment, the emphasized portion(s) of a spoken original language is reflected, para-language information (intent or feeling) other than the emphasis information can also be processed in the same way as the above.

The invention is not limited to the speech translation system for processing two languages, but is also applicable to a single-language system, such as a dialog system for robots, which requires output of speech with to-be-emphasized portions appropriately emphasized.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech translation apparatus using speech recognition comprising:

a first generation unit configured to generating, via execution of instructions on a computer, a first text representing a speech recognition result obtained by subjecting an input speech in a first language to speech recognition, and first prosody information corresponding to the input speech, the first text containing a plurality of first portions each including at least one word;

a second generation unit generating, from the first prosody information, first para-language information other than a text contained in the input speech, the first para-language information containing the first portions and a plurality of second portions;

a first association unit associating each first portion of the first text with a corresponding first portion of the first portions of the first para-language information;

a translation unit translating the first text into a plurality of second texts in a second language, the second texts each containing the second portions;

a second association unit associating each second portion of the first para-language information with a corresponding second portion of the second portions of each of the second texts that is one portion obtained by translating each first portion of the first text;

a third generation unit generating a plurality of second prosody information items based on speech feature amounts acquired from the second texts;

a fourth generation unit generating a plurality of second para-language information items by changing order of the first and second portions of the first para-language information to correspond to the second texts, based on the second prosody information items, the second para-language information items corresponding to the second texts;

a computation unit computing, for each second text, a degree of similarity between each of the first para-language information items and a corresponding one of the second para-language information items to obtain degrees of similarity for the second texts;

a selection unit selecting, from the second prosody information items, maximum-degree-of-similarity prosody information corresponding to a maximum degree of similarity from the degrees of similarity;

a fifth generation unit generating a prosody pattern of one of the second texts which corresponds to the maximum-degree-of-similarity prosody information, based on the maximum-degree-of-similarity prosody information; and an output unit outputting one of the second texts which corresponds to the maximum-degree-of-similarity prosody information, in a form of speech according to the prosody pattern.

2. The apparatus according to claim 1, wherein:

the first text has a plurality of third portions each including a group of words, the first para-language information has a plurality of fourth portions, the first association unit associates third portion of the first text with a corresponding third portion of the first para-language information; and the second association unit associates each fourth portion of the first para-language information with a corresponding fourth portion of each of the second texts, each third portion being translated into the fourth corresponding portion.

3. The apparatus according to claim 1, wherein the computation unit computes the degrees of similarity such that a higher degree of similarity is obtained as a number of identical portions included in each of the first para-language information items and a corresponding one of the second para-language information items is increased, and such that a lower degree of similarity is obtained as a number of different portions included in each of the first para-language information items and a corresponding one of the second para-language information items is increased.

4. The apparatus according to claim 1, wherein the first generation unit generates, as the first prosody information, information including one of a strong/weak accent of each word included in the result of recognition, a high/low accent of each word included in the result of recognition, and intent of an entire portion of the input speech.

5. The apparatus according to claim 1, wherein the second generation unit and the fourth generation unit generates, as the first para-language information and the second para-language information items, information with tags imparted to target portions of the first para-language information and the second para-language information items, the tags each indicating one of a strong/weak accent of each word included in the result of recognition, a high/low accent of each word included in the result of recognition, and intent of an entire portion of the input speech.

6. The apparatus according to claim 1, wherein the second generation unit and the fourth generation unit detects a power value of each portion of the first and second texts, based on the first prosody information and the second prosody information, and generate information indicating that portions of the first text and the second texts corresponding to detected maximum power values are regarded as emphasized portions with accents.

7. The apparatus according to claim 1, wherein the second texts obtained by the translation unit differ from each other at least partially.

8. A speech translation method using speech recognition comprising:

generating a first text representing a speech recognition result obtained by subjecting an input speech in a first language to speech recognition, and first prosody information corresponding to the input speech, the first text containing a plurality of first portions each including at least one word;

generating, from the first prosody information, first para-language information other than a text contained in the input speech, the first para-language information containing the first portions and a plurality of second portions;

associating each first portion of the first text with a corresponding first portion of the first portions the first para-language information;

translating the first text into a plurality of second texts in a second language, the second texts each containing the second portions;

associating each second portion of the first para-language information with a corresponding second portion of the second portions of each of the second texts that is one portion obtained by translating each first portion of the first text;

generating a plurality of second prosody information items based on speech feature amounts acquired from the second texts;

generating a plurality of second para-language information items by changing order of the first and second portions of the first para-language information to correspond to the second texts, based on the second prosody information items, the second para-language information items corresponding to the second texts;

computing, for each second text, a degree of similarity between each of the first para-language information items and a corresponding one of second para-language information items to obtain degrees of similarity for the second texts;

selecting, from the second prosody information items, maximum-degree-of-similarity prosody information corresponding to a maximum degree of similarity from the degrees of similarity;

generating a prosody pattern of one of the second texts which corresponds to the maximum-degree-of-similarity prosody information, based on maximum-degree-of-similarity prosody information; and outputting one of the second texts which corresponds to the maximum-degree-of-similarity prosody information, in a form of speech according to the prosody pattern.

9. The method according to claim 8, wherein:

the first text has a plurality of third portions each including a group of words, the first para-language information has a plurality of fourth portions, associating each first portion of the first text associates each third portion of the first text with a corresponding third portion of the first para-language information; and associating each second portion of the first para-language information associates each fourth portion of the first para-language information with a corresponding fourth portion of each of the second texts, each third portion being translated into the fourth corresponding portion.

10. The method according to claim 8, wherein computing the degree of similarity computes the degrees of similarity such that a higher degree of similarity is obtained as a number of identical portions included in each of the first para-language information items and a corresponding one of the second para-language information items is increased, and such that a lower degree of similarity is obtained as a number of different portions included in each of the first para-language information items and a corresponding one of the second para-language information items is increased.

11. The method according to claim 8, wherein generating a first text generates, as the first prosody information, information including one of a strong/weak accent of each word included in the result of recognition, a high/low accent of each word included in the result of recognition, and intent of an entire portion of the input speech.

12. The method according to claim 8, wherein generating the first para-language information and generating the second para-language information items generate, as the first para-language information and the second para-language information items, information with tags imparted to target portions of the first para-language information and the second para-language information items, the tags each indicating one of a strong/weak accent of each word included in the result of recognition, a high/low accent of each word included in the result of recognition, and intent of an entire portion of the input speech.

13. The method according to claim 8, wherein generating the first para-language information and generating the second para-language information items detect a power value of each portion of the first and second texts, based on the first prosody information and the second prosody information, and generate information indicating that portions of the first texts and the second texts corresponding to detected maximum power values are regarded as emphasized portions with accents.

14. The method according to claim 8, wherein the second texts differ from each other at least partially.

15. A non-transitory computer readable storage medium storing instructions of a computer program which when executed by a computer results in performance of steps comprising:
  generating a first text representing a speech recognition result obtained by subjecting an input speech in a first language to speech recognition, and first prosody information corresponding to the input speech, the first text containing a plurality of first portions each including at least one word;
  generating, from the first prosody information, first para-language information other than a text contained in the input speech, the first para-language information containing the first portions and a plurality of second portions;
  associating each first portion of the first text with a corresponding first portion of the first portions the first para-language information;
  translating the first text into a plurality of second texts in a second language, the second texts each containing the second portions;
  associating each second portion of the first para-language information with a corresponding second portion of the second portions of each of the second texts that is one portion obtained by translating each first portion of the first text;
  generating a plurality of second prosody information items based on speech feature amounts acquired from the second texts;
  generating a plurality of second para-language information items by changing order of the first and second portions of the first para-language information to correspond to the second texts, based on the second prosody information items, the second para-language information items corresponding to the second texts;
  computing, for each second text, a degree of similarity between each of the first para-language information items and a corresponding one of second para-language information items to obtain degrees of similarity for the second texts;
  selecting, from the second prosody information items, maximum-degree-of-similarity prosody information corresponding to a maximum degree of similarity from the degrees of similarity;
  generating a prosody pattern of one of the second texts which corresponds to the maximum-degree-of-similarity prosody information, based on maximum-degree-of-similarity prosody information; and
  outputting one of the second texts which corresponds to the maximum-degree-of-similarity prosody information, in a form of speech according to the prosody pattern.

16. The medium according to claim 15, wherein:
the first text has a plurality of third portions each including a group of words, the first para-language information has a plurality of fourth portions,
associating each first portion of the first text associates each third portion of the first text with a corresponding third portion of the first para-language information; and
associating each second portion of the first para-language information associates each fourth portion of the first para-language information with a corresponding fourth portion of each of the second texts, each third portion being translated into the fourth corresponding portion.

17. The medium according to claim 15, wherein computing the degree of similarity computes the degrees of similarity such that a higher degree of similarity is obtained as a number of identical portions included in each of the first para-language information items and a corresponding one of the second para-language information items is increased, and such that a lower degree of similarity is obtained as a number of different portions included in each of the first para-language information items and a corresponding one of the second para-language information items is increased.

18. The medium according to claim 15, wherein generating a first text generates, as the first prosody information, information including one of a strong/weak accent of each word included in the result of recognition, a high/low accent of each word included in the result of recognition, and intent of an entire portion of the input speech.

19. The medium according to claim 15, wherein generating the first para-language information and generating the second para-language information items generate, as the first para-language information and the second para-language information items, information with tags imparted to target portions of the first para-language information and the second para-language information items, the tags each indicating one of a strong/weak accent of each word included in the result of recognition, a high/low accent of each word included in the result of recognition, and intent of an entire portion of the input speech.

20. The medium according to claim 15, wherein generating the first para-language information and generating the second para-language information items detect a power value of each portion of the first and second texts, based on the first prosody information and the second prosody information, and generate information indicating that portions of the first texts and the second texts corresponding to detected maximum power values are regarded as emphasized portions with accents.

21. The medium according to claim 15, wherein the second texts differ from each other at least partially.

* * * * *

UNITED STATES PATENT AND TRADEMARK OFFICE
CERTIFICATE OF CORRECTION

| | | |
|---|---|---|
| PATENT NO. | : 8,073,677 B2 | Page 1 of 1 |
| APPLICATION NO. | : 12/048255 | |
| DATED | : December 6, 2011 | |
| INVENTOR(S) | : Furihata et al. | |

It is certified that error appears in the above-identified patent and that said Letters Patent is hereby corrected as shown below:

Claim 1, column 10, line 26, change "unit configured to generating" to --unit generating--.

Claim 2, column 11, line 15, change "associates third portion" to --associates each third portion--.

Signed and Sealed this
Twentieth Day of March, 2012

David J. Kappos
*Director of the United States Patent and Trademark Office*